Jan. 20, 1948.                L. H. FLORA                2,434,844
                           FASTENING DEVICE
            Filed Nov. 8, 1945            2 Sheets-Sheet 1
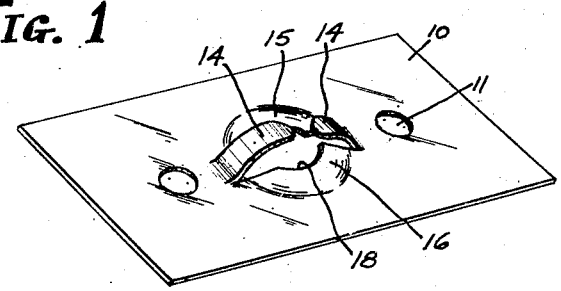
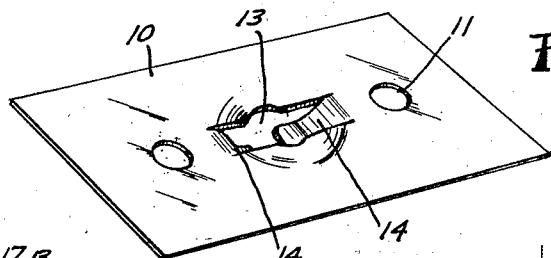
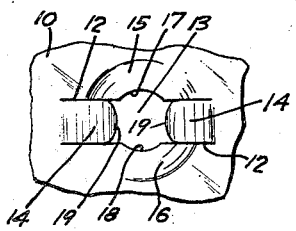
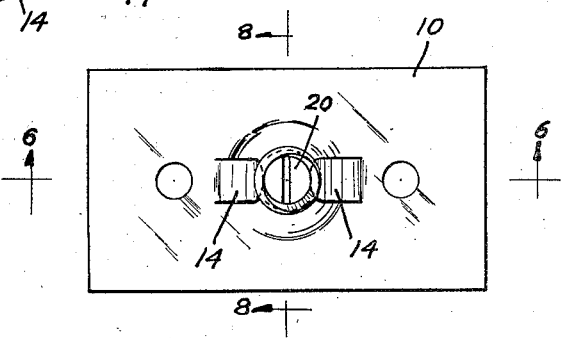
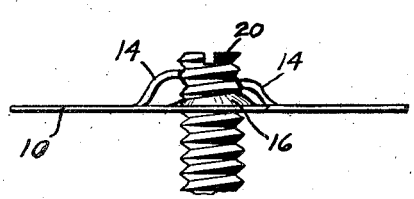
INVENTOR.
LAURENCE H. FLORA
BY
ATTORNEYS Jan. 20, 1948.    L. H. FLORA    2,434,844
FASTENING DEVICE
Filed Nov. 8, 1945    2 Sheets-Sheet 2

INVENTOR.
LAURENCE H. FLORA
BY
Bates, Teare, & McKean
ATTORNEYS

Patented Jan. 20, 1948

2,434,844

UNITED STATES PATENT OFFICE 2,434,844

FASTENING DEVICE

Laurence H. Flora, Cleveland, Ohio, assignor to Tinnerman Products, Inc., Cleveland, Ohio, a corporation of Ohio Application November 8, 1945, Serial No. 627,400

5 Claims. (Cl. 151—21)

This invention applies to fastening devices and more particularly to a sheet metal nut adapted to coact with a screw or threaded shaft. It is well adapted to serve as a traveling nut engaging a lead screw and carrying or otherwise controlling a settable or tunable part in an instrument or piece of radio apparatus. Alternatively the nut may be fixed in position and carry an adjusting screw for similar or other purposes.

An object of this invention is to provide a nut having sufficient friction with the coacting screw to maintain its adjusted position thereupon, but which will allow easy changing of such adjustment.

Another object is to provide a nut simple in form, which will prevent backlash of the coacting screw when used in a tuning or other adjusting device.

To these ends I have provided a device which furnishes a nut by means of warped edges for engagement in the screw thread and, at the same time, furnishes a spring tension and anti-backlash device by means of spring fingers which also engage the screw thread.

Figure 6:
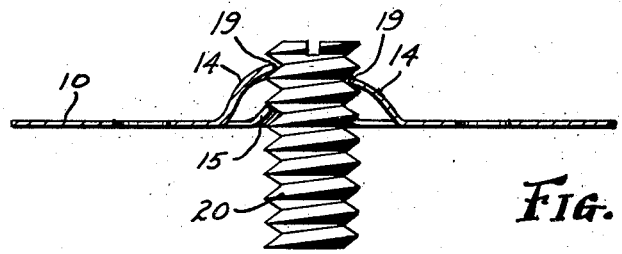
Figure 7:
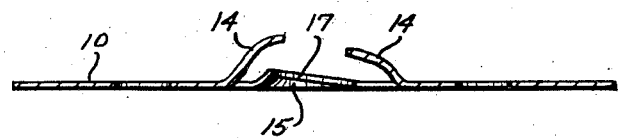
Figure 8:
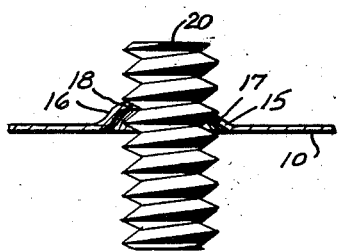
Figure 9:
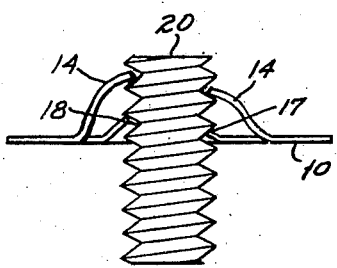
Figure 10:
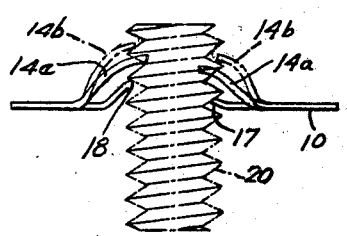

Referring now to the drawings, Fig. 1 is a top perspective view of a preferred form of the sheet metal nut of this invention; Fig. 2 is a bottom perspective view; Fig. 3 is a plan view of the nut, including a screw in engagement therewith; Fig. 4 is a fragmentary plan view of the nut with the screw omitted; Fig. 5 is a side elevation of the nut and screw of Fig. 3; Fig. 6 is a longitudinal section taken on the line 6—6 of Fig. 3; Fig. 7 is a similar view with the screw omitted; Fig. 8 is a transverse section taken on the line 8—8 of Fig. 3; Fig. 9 is a diagrammatic view of the nut and screw with the spring fingers revolved into the plane of Fig. 8 to show the inter-relationship thereof with the warped edge; and Fig. 10 is a similar diagrammatic view showing the normal or un-engaged position of the spring fingers in full line, and the engaged position in broken line.

The embodiment of the present invention which I have illustrated in the drawings comprises a flat sheet metal body 10 which may be provided with mounting holes 11. Parallel slits 12 are made in the material and the central region between them is pierced, as at 13, to provide a substantially round aperture. The remaining material between the slits defines two spring fingers 14 which are bent upwardly from the plane of the body 10. The material at either side of the aperture is deformed, as at 15 and 16, to produce helical edges 17 and 18 for engagement with the helical threads on the coacting screw. The ends 19 of the spring fingers may advantageously be convexly rounded for smooth engagement with the screw threads as will later be described.

In use a screw 20, Fig. 5, is inserted from the bottom and threaded upwardly in engagement with the warped edge. As best seen in the diagram of Fig. 10, the distance between the free ends of the spring fingers 14a in their normal or unengaged position, is smaller than the outside diameter of the screw. Therefore, as the screw moves upwardly, it engages the fingers and raises them until, upon further movement, they snap over the crest of the first full convolution and come to rest upon the leading surface of the second in the position 14b of Fig. 10. Since the fingers are under spring tension, they urge the screw downwardly against the warped edges 17 and 18, producing an effective anti-backlash action since the warped edges are prevented from vibrating or otherwise moving away from the lower surface of the screw thread.

As shown in the diagram of Fig. 9, the present embodiment contemplates the engagement of the spring fingers with the upper surface of a thread next above the one whose lower surface is engaged by the warped edge. It will be apparent that the fingers could be made shorter or longer and thus engage the same screw thread as does the warped edge or any other screw thread and yet accomplish substantially the same results.

Sheet metal nuts have heretofore been designed for use in firmly clamping one article to another. In these it has been found advantageous to so design the thread-engaging elements that they will be deformed and bite into the root of the screw as the nut is firmly turned home upon the article. The screw thread at the point of contact in such case is usually more or less marred or injured. It will be noted that the action contemplated in the present invention however is entirely different inasmuch as the nut is intended to travel back and forth upon the thread. It is always desirable and sometimes absolutely necessary in tuning applications that adjustments of the parts, or travel of the nut along the lead screw, be smooth and accurate. Hence the screw thread itself must remain smooth and unmarred. The nut of the present invention meets this requirement admirably as it relies solely upon frictional engagement for its holding power. It will be noted in Figs. 8, 9 and 10 that the diameter of the helix defined by the warped edges is substantially larger than the root diameter of the screw, and that the edge, therefore, rides solely upon the smooth undersurface of the thread. It will also be noted that the spring fingers are of such form and length that their inner ends engage only the upper smooth surface of a thread. Furthermore, because of the rounded form of their ends, as best seen in Fig. 5 at 19, there is no sharp corner which could possibly bite into the thread. Smooth action of the nut without backlash is thereby assured.

It will be obvious that while I have shown a particular form of the device, numerous modifications of the thread-engaging portion and of the spring fingers, as well as of the body and mounting provisions therefor, may be made without departing from the spirit and scope of my invention.

It is entirely within the purview of this invention to have the spring fingers of Fig. 9, for example, engage the under surface of the screw thread, and to have the warped edges engage the upper surface thereof. This, in effect, places the intermediate section of the screw in tension, whereas the illustrated engagement places it in compression. The alternative method of engagement accomplishes substantially the same results and is effected by inserting the screw from the top and, after engagement with the spring fingers, forcing it slightly downwardly until it threadedly engages the warped edge.

I claim:

1. A fastening device comprising a sheet metal body having an aperture defining a nut and spring elements projecting therefrom comprising marginal portions of said aperture, said spring elements adapted to resiliently engage only the leading surface of a thread of a screw while only the following surface is engaged by the nut.

2. A nut comprising a sheet metal body having an aperture and two sets of thread engaging elements comprising marginal portions of said aperture struck from the body and adapted to exert a compressive force in opposite directions axially of a threaded member adapted to extend through the aperture.

3. A nut comprising a sheet metal body having an aperture, protuberances struck from the body and adapted to threadingly engage a screw-threaded member, and spring fingers comprising marginal portions of said aperture struck from the body and adapted to press axially upon the thread to prevent backlash thereof at the protuberances but allow easy turning of the screw threaded member.

4. A fastening device comprising a sheet metal body, having an aperture the edge of which is deformed to define a helix for engagement with a screw, and spring fingers comprising marginal portions of said aperture struck from the body and adapted to resiliently engage the screw thread and urge it axially into firm engagement with the helical edge.

5. A nut comprising a sheet metal body having an aperture and opposing pairs of parallel slits provided in marginal portions of said aperture, the material between the pairs of slits being struck from the plane of the body to form spring fingers, and the material remaining between the fingers being deformed to produce helical thread-engaging edges at the aperture, the spring fingers having rounded ends adapted to resiliently engage only the leading surface of the thread of a screw and urge the following surface of the thread against the helical edges.

LAURENCE H. FLORA.

REFERENCES CITED

The following references are of record in the file of this patent:

UNITED STATES PATENTS

| Number | Name | Date |
| --- | --- | --- |
| 1,885,459 | McDonnel | Nov. 1, 1932 |
| 2,215,560 | Oddie | Sept. 24, 1940 |
| 2,295,480 | Johnson | Sept. 8, 1942 |
| 2,342,170 | Tinnerman | Feb. 22, 1944 |
| 2,394,491 | Schaper | Feb. 5, 1946 |
| 2,394,728 | Tinnerman | Feb. 12, 1946 |
| 2,407,830 | Griffin | Sept. 17, 1946 |

FOREIGN PATENTS

| Number | Country | Date |
| --- | --- | --- |
| 474,494 | Great Britain | Nov. 2, 1937 |